No. 748,778. PATENTED JAN. 5, 1904.
L. H. NASH.
METER REGISTERING MECHANISM.
APPLICATION FILED JULY 5, 1900.
NO MODEL. 2 SHEETS—SHEET 1.

WITNESSES:
H. L. Reynolds.
Guy H. Johnson.

INVENTOR
Lewis Hallock Nash
BY
Johnson & Johnson
his ATTORNEYS.

No. 748,778. PATENTED JAN. 5, 1904.
L. H. NASH.
METER REGISTERING MECHANISM.
APPLICATION FILED JULY 5, 1900.
NO MODEL. 2 SHEETS—SHEET 2.

No. 748,778. Patented January 5, 1904.

UNITED STATES PATENT OFFICE.

LEWIS HALLOCK NASH, OF SOUTH NORWALK, CONNECTICUT, ASSIGNOR TO NATIONAL METER COMPANY, OF NEW YORK, N. Y., A CORPORATION OF NEW YORK.

METER REGISTERING MECHANISM.

SPECIFICATION forming part of Letters Patent No. 748,778, dated January 5, 1904.

Application filed July 5, 1900. Serial No. 22,609. (No model.)

*To all whom it may concern:*

Be it known that I, LEWIS HALLOCK NASH, a citizen of the United States, and a resident of South Norwalk, in the county of Fairfield and State of Connecticut, have invented a new and Improved Meter Registering Mechanism, of which the following is a full, clear, and exact description.

My invention relates to an improvement in devices used for connecting the meter-piston with the registering mechanism, and comprises novel features which will be hereinafter described, and particularly pointed out in the claims.

Reference is to be had to the accompanying drawings, forming a part of this specification, in which similar characters of reference indicate corresponding parts in all the figures.

Figure 1:
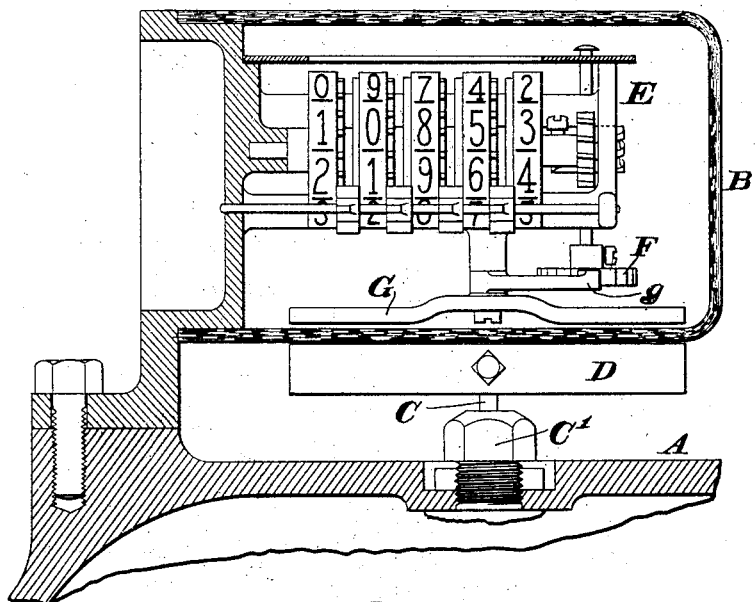
Figure 2:
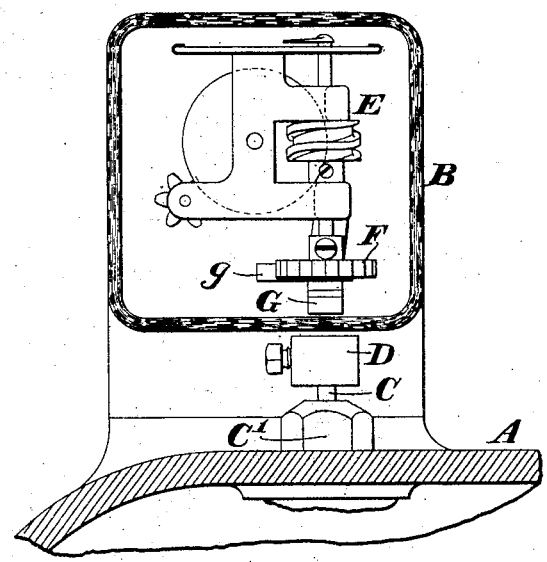
Figure 3:
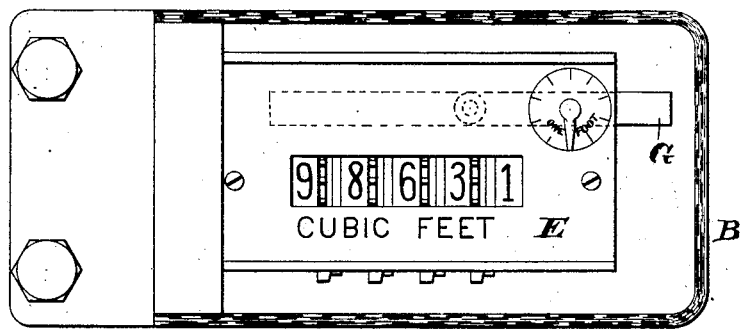
Figure 4:
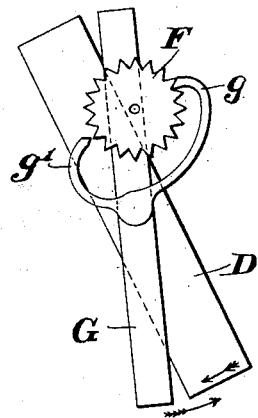
Figure 5:
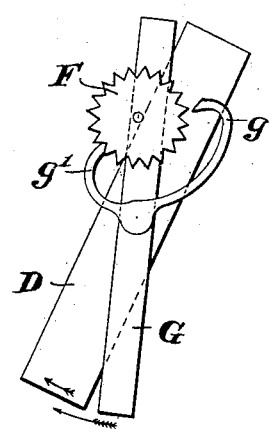

Figure 1 is a sectional elevation showing my improvements. Fig. 2 is a sectional elevation taken at right angles to Fig. 1. Fig. 3 is a sectional plan, and Figs. 4 and 5 are diagrams showing the novel parts of the mechanism in different positions.

The device in the form shown in the above figures is given simply as an illustration of a preferred form of carrying out my invention. It is not, however, to be understood as the only form which might be used or of which I am cognizant, as I am aware of many other ways in which the essential principle of my invention may be utilized.

The registering mechanism proper, E, may be of any convenient form of construction. I have herein shown such a mechanism of what is ordinarily known as the "straight" reading type—that is, a type in which disks are used having figures upon their periphery and mounted upon a common axis, the reading of the meter being taken through a slot. Any form of registering mechanism may, however, be used. This registering mechanism is actuated in any convenient manner, the means herein shown consisting of a ratchet or escapement wheel F, which is connected in any suitable manner with the registering mechanism to actuate it.

Mounted upon a shaft within the meter-case B is a bar G, which carries two arms or pallets $g$ and $g'$, adapted to engage the escapement-wheel upon opposite sides, so as to actuate the same when the bar G is oscillated. This is a well-known means for turning a shaft by small increments. The registering mechanism, together with the oscillating bar G, is inclosed within a case B, which is herein indicated as being made of glass and should be hermetically sealed, so that moisture cannot enter the case and interfere with the operation of the parts contained therein. The bar G is mounted as close as is feasible to one side of the case. Outside of the case and closely adjacent this bar is mounted a permanent magnet D, which is supported to turn upon the shaft C, which passes through a stuffing-box C' into the case which contains the meter, a portion A of said case being herein shown. This shaft is rotatably connected with the meter-piston in any desired or convenient manner—preferably through the interposition of a reducing mechanism—and is placed substantially in line with the pivot of the bar G. The action of the magnet upon said bar is illustrated diagrammatically in Figs. 4 and 5. As the magnet is turned through its connection with the meter-piston it acts upon the bar G to oscillate it. In Figs. 4 and 5 an arrow is placed upon the magnet D to indicate its direction of revolution. As its ends approach parallelism with the bar G the ends of this bar are attracted toward the magnet, thus engaging the pallet $g$ with a tooth of the wheel F and turning it a distance corresponding substantially with half the distance between consecutive teeth of the wheel. As the magnet passes the position where it is parallel with the bar G it draws the bar after it, so as to engage the opposite pallet $g'$ with a tooth of the wheel, so as to advance it a half-tooth space. The bar G is thus caused to oscillate, the direction of motion being indicated in Figs. 4 and 5 by the oppositely-pointing arrows. The bar G is thus given a complete to-and-fro oscillation for each half-revolution of the magnet D, thus advancing the wheel F two tooth-spaces for each revolution of the magnet.

It is evident that many other forms of mechanism may be used for communicating the oscillation of the bar G to the registering apparatus. The mechanism shown and described herein is simply given as the mechanism which is at present preferred by me. The mechanism in its entirety, as herein shown, enables the registering mechanism to be inclosed within a hermetically-sealed case, so that it is impossible for water to enter therein, even if the meter is entirely submerged. It is also impossible for the registering mechanism to be tampered with.

For convenience of examination the case B has herein been described as made of glass. It is, however, evident that the case may be made of any material which does not interfere with the passage of the magnetic force from the magnet to the bar G; but in case it is made of any opaque substance a transparent window should be provided, through which the reading of the device may be obtained.

Having thus fully described my invention, I claim as new and desire to secure by Letters Patent—

1. The combination with a meter, of a registering mechanism, a hermetically-sealed case for the registering mechanism, and means controlled by the meter for magnetically actuating the registering mechanism.

2. The combination with a meter having a hermetically-sealed case and a registering mechanism within said case, of a magnet connected with and moved by the meter-piston and outside of said sealed case, and a member within said case and inductively moved by said magnet to operate the registering mechanism.

3. The combination with a meter having a hermetically-sealed case and a registering mechanism within said case, of a magnet connected with the meter-piston to be revolved thereby outside said case, and an oscillating magnetic member within said case and connected with the registering mechanism to operate it and inductively moved by said magnet.

4. The combination with a meter and a registering mechanism, of a magnet connected with the meter-piston to be revolved thereby, and an oscillating magnetic member mounted upon an axis substantially corresponding with that of the magnet and connected with the registering mechanism to operate it, whereby it is given a complete to-and-fro oscillation at each passage of the magnet.

5. The combination with a meter and a registering mechanism, comprising as a member thereof an escapement-wheel, of a magnet rotatively connected with the meter-piston, a bar pivoted within the magnetic field of the magnet and oscillated by said magnet, and pallets or arms operated by said bar and adapted to alternately engage the escapement-wheel to turn it.

6. The combination with a meter, a registering mechanism comprising as a member thereof an escapement-wheel, and a case inclosing the registering mechanism, of a magnet rotatively connected with the meter-piston and adjacent the registering mechanism, a bar pivoted within the case inclosing the registering mechanism and within the magnetic field of the magnet, said bar being oscillated by the magnet, and pallets or arms operated by said bar and adapted to alternately engage the escapement-wheel to turn it.

7. The combination with a meter, a registering mechanism comprising as a member thereof an escapement-wheel, and a hermetically-sealed case inclosing said registering mechanism, of a magnet rotatively connected with the meter-piston and exteriorly adjacent the said case, a magnetic bar pivoted within the case and oscillated by said magnet, and pallets operated by said bar and engaging the wheel to turn it.

8. The combination with a meter having attached thereto a sealed case containing the registering mechanism, of two coöperating magnetic members, one without said case and connected to be rotated by the meter, and the other within the said case and connected with the registering mechanism to actuate it, said member within the case being pivoted and means for limiting it to an oscillating motion.

LEWIS HALLOCK NASH.

Witnesses:
H. L. REYNOLDS,
CHAS. J. RATHJEN.